Figure 1:
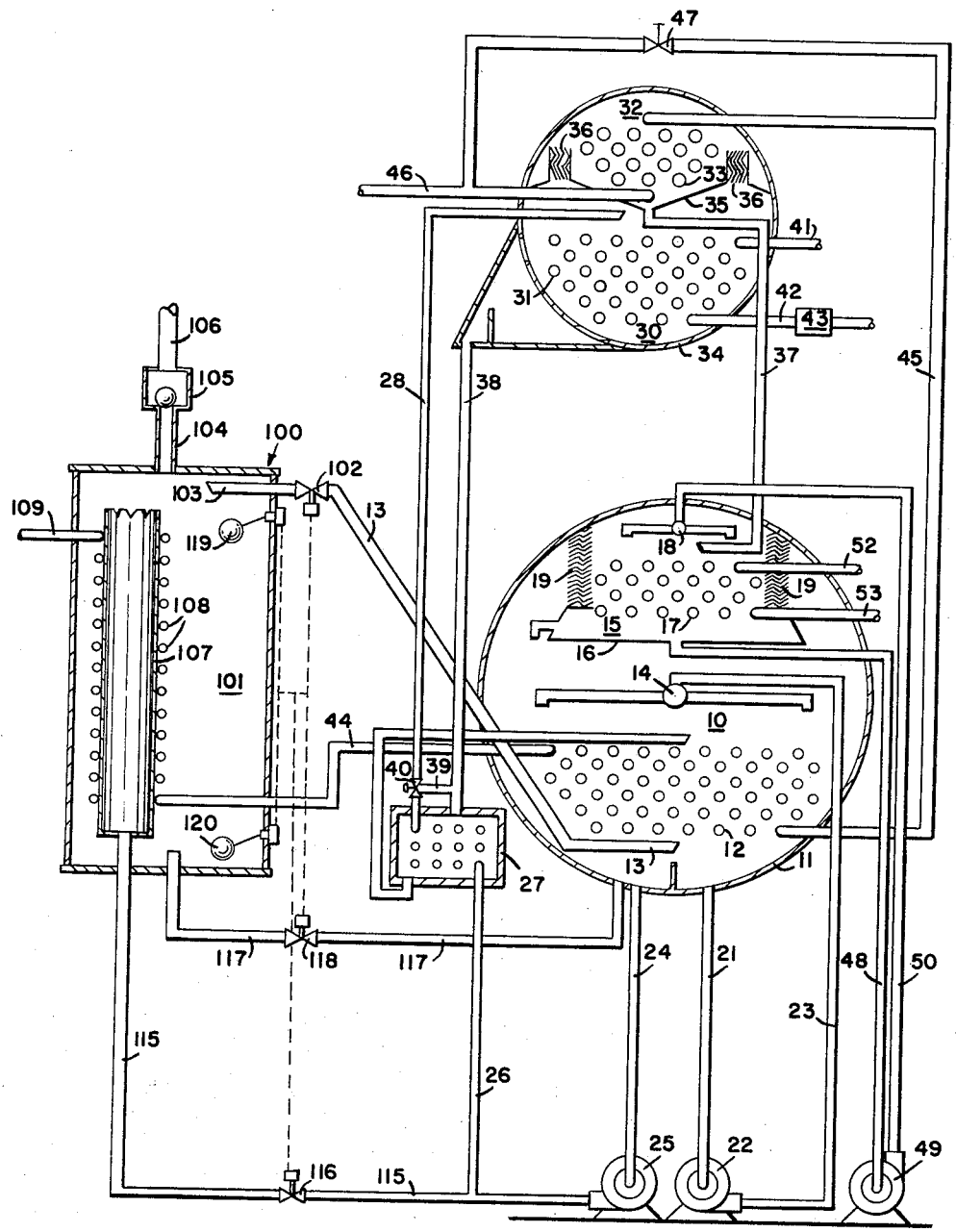

FIG. I

INVENTORS.
JOSEPH R. BOURNE.
KEITH V. EISBERG.
BY Frank N. Decker Jr.
ATTORNEY.

INVENTORS.
JOSEPH R. BOURNE.
KEITH V. EISBERG.
BY Frank N. Decker Jr.
ATTORNEY.

United States Patent Office 3,138,005
Patented June 23, 1964

3,138,005
PURGE ARRANGEMENTS
Joseph R. Bourne, Dewitt, and Keith V. Eisberg, Camillus, N.Y., assignors to Carrier Corporation, Syracuse, N.Y., a corporation of Delaware
Filed Mar. 28, 1962, Ser. No. 183,257
18 Claims. (Cl. 62—85)

This invention relates to purging refrigeration systems of undesirable gases. More particularly, this invention relates to a purge arrangement and a method of purging which is adapted to remove relatively noncondensible gases from an absorption refrigeration machine.

Various refrigeration systems require that relatively noncondensible gases be removed therefrom in order to operate efficiently. For example, when noncondensible gases are present in an absorption refrigeration machine, even in small quantities, the refrigeration capacity of the machine is greatly reduced. The interior of the absorber of a typical absorption refrigeration machine may operate at a pressure of less than 1/100 of atmospheric pressure, and, therefore, air tends to leak through minute passages in joints or welds of the machine. The air leaking into such a machine is composed of relatively noncondensible gases which prevent proper absorption of refrigerant in the absorber of the machine by blanketing the absorbent solution and by reducing heat transfer from the absorbent solution to the absorber tubes. Furthermore, the oxygen in air which leaks into an absorption refrigeration machine may react with copper or steel surfaces within the machine and cause corrosion. The corrosion of these metal surfaces may in some cases be so severe as to cause complete failure of the machine after a realtively short period of time.

Another source of noncondensible gases in an absorption refrigeration machine results from the by-products of corrosion reactions which may occur within such a machine, even in the absence of oxygen. For example, hydrogen may be liberated as a by-product of galvanic corrosion between steel and copper when both are in contact with an electrolyte, such as the absorbent solution.

For effective operation of such a refrigeration system, it is necessary to remove these relatively noncondensible gases and to transfer them either to a portion of the machine which is not adversely affected by them, or to dispose of them from the machine.

Accordingly, it is an object of this invention to provide an improved purge unit and method of purging a portion of a refrigeration system of relatively noncondensible gases.

It is a further object of this invention to provide an improved method and means of purging an absorption refrigeration machine.

In the illustrated, preferred embodiments of this invention, these and other objects thereof are achieved by providing a separation chamber, means to transfer noncondensible gases from an undesired location in a refrigeration machine to displace a liquid in the separation chamber, and means to flood the separation chamber with a liquid under sufficient pressure to expel the noncondensible gases therefrom through a check valve to a desired region, such as the atmosphere. The noncondensible gases are, therefore, transferred from the undesired location in the refrigeration machine to the separation chamber where they displace the liquid therein and from which they are inhibited from returning to the refrigeration machine. Liquid is then pumped into the separation chamber under pressure sufficient to expel the gases through a check valve to the desired location. It can be seen that this system for purging a refrigeration machine possesses the advantages of being relatively inexpensive, while at the same time not affording an opportunity for the return of air to the refrigeration system, since the separation chamber need not be exposed to the atmosphere.

One modification of the invention utilizes an auxiliary absorber having a lower pressure than the absorber section of an absorption refrigeration machine to withdraw and transfer noncondensible gases from the absorber section to the separation chamber of the purge unit. Another modification of this invention is shown as utilizing a jet ejector for the withdrawing and transferring functions. In addition, it will be apparent that other suitable withdrawal and transfer mechanisms may be utilized if desired, such as a fall tube or an inexpensive diaphragm pump, to achieve these functions.

Figure 2:
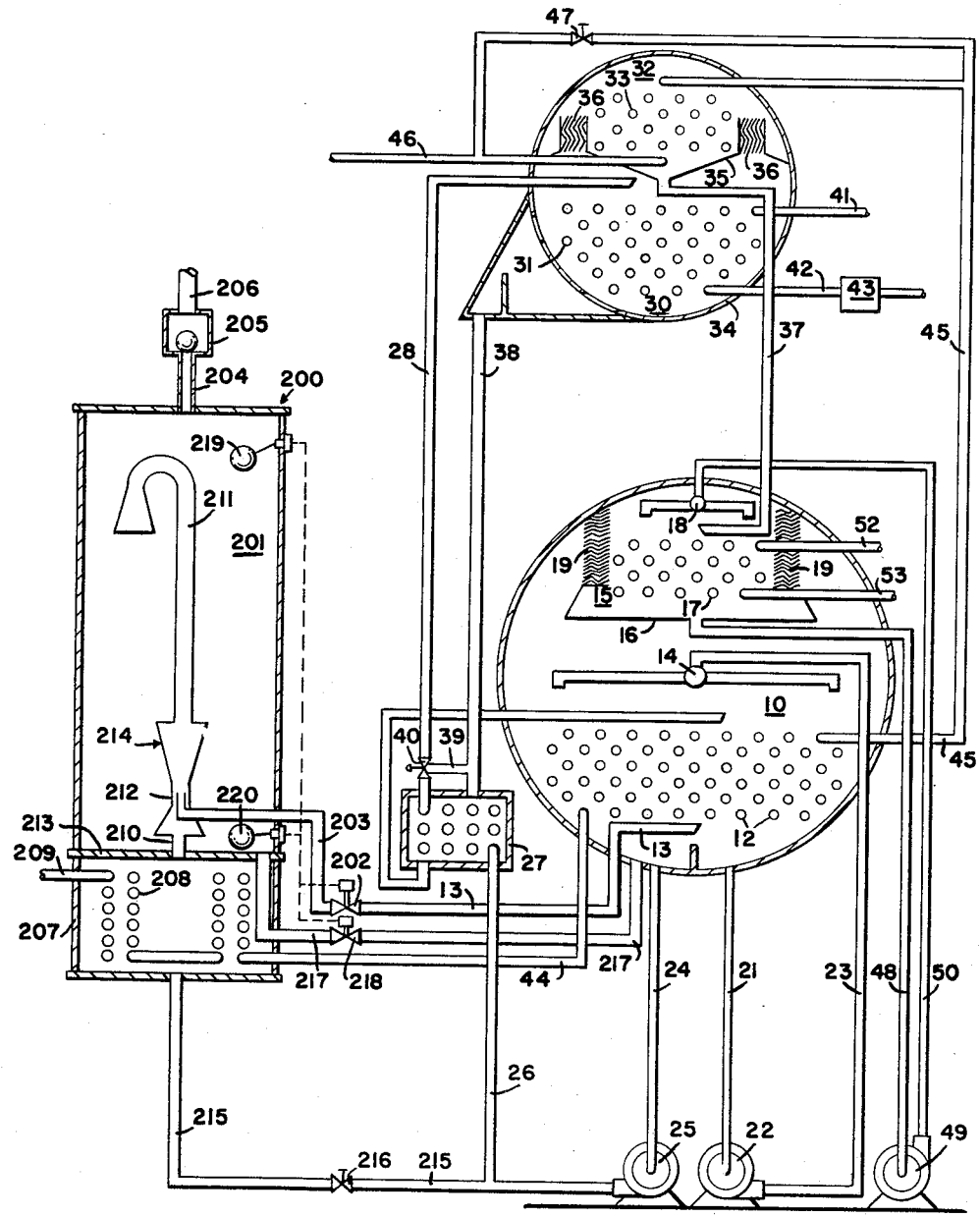

These and other objects of this invention will become apparent by reference to the following specification and attached drawings wherein:

FIGURE 1 is a diagrammatic view, partially in cross-section, of an absorption refrigeration machine illustrating one embodiment of this invention, and FIGURE 2 is a diagrammatic view, partially in cross-section, of an absorption refrigeration machine illustrating another modification of this invention.

Referring generally to the figures of the drawing, there is shown an absorption refrigeration machine comprising an absorber section 10 within a shell 11. A plurality of heat exchange tubes 12 are provided within the absorber section. A purge line 13 leads from a suitable region of the absorber and serves to conduct noncondensible gases therefrom to a suitable purge unit 100. A spray header 14 is located above the absorber section.

Also disposed in shell 11 is an evaporator section 15 comprising a pan-like member 16 within which may be disposed a plurality of heat exchange tubes 17. A spray header 18 may be located above heat exchange tubes 17 for distributing refrigerant thereover. A plurality of eliminators 19 are provided to prevent entrained liquid refrigerant particles being carried from evaporator section 15 to absorber section 10. Evaporator section 15 is in communication with absorber section 10 through eliminators 19.

In operation, the system is evacuated to a low pressure by being purged of relatively noncondensible gases and a suitable refrigerant is sprayed over tubes 17 in evaporator section 15 while a suitable absorbent solution is sprayed over tubes 12 in absorber section 10. Refrigerant is vaporized in evaporator section 15 and passes through the eliminators into absorber section 10 where the refrigerant vapor is absorbed by the absorbent solution. The heat required to vaporize the refrigerant in evaporator section 15 is provided by the fluid passing through heat exchange tubes 17 which is thereby cooled, and this heat is carried with the vapor into absorber section 10 where it is given up to a cooling fluid passing through heat exchange tubes 12. Thus, the evaporation of refrigerant in evaporator section 15 produces a cooling or refrigeration effect on the fluid passing through heat exchange tubes 17 by removing heat therefrom to vaporize the refrigerant.

Line 21 is connected to solution recirculation pump 22 and serves to circulate absorbent solution of intermediate strength accumulated in one section of the lower portion of absorber section 10 through line 23 to spray header 14 in order to recirculate absorbent solution in the absorber. A line 24 leads from another section of the lower portion of absorber section 10 containing weak solution and solution pump 25 serves to pass the weak solution through line 26 and solution heat exchanger 27 through line 28 to generator section 30.

As used herein, the term "strong solution" refers to an absorbent solution strong in absorbing power and the term "weak solution" refers to absorbent solution weak in absorbing power. The term "intermediate strength solution" refers to a solution having a concentration intermediate that of strong solution and weak solution.

A suitable absorbent for a refrigeration system of the type described comprises a hygroscopic aqueous salt solution such as lithium bromide and water and a suitable refrigerant is water. The concentration of the strong solution leaving the generator may be about 65%.

The absorption of refrigerant vapor by absorbent solution in absorber section 10 dilutes the absorbent solution, reducing its absorptive power, and diminishes the refrigerant supply which must be replenished in order to maintain the refrigeration machine in operation. It is desirable, therefore, to concentrate the weak solution by separating it from the absorbed refrigerant and to return the refrigerant to the evaporator section and the concentrated absorbent solution to the absorber section. For this purpose, a generator section 30 and a condenser section 32 are provided.

Generator section 30 is located in shell 34 and comprises a plurality of heat exchange tubes 31 for placing steam or other heating fluid in heat exchange relation with solution in the generator. Also located within shell 34 is condenser section 32 comprising a pan-like member 35 within which is disposed a plurality of heat exchange tubes 33 for passing cooling water. Eliminators 36 are provided to prevent strong solution from being entrained in refrigerant vapor passed from generator section 30 to condenser section 32.

A line 37 leads from pan-like member 35 to evaporator section 15 and serves to return condensed refrigerant from the condenser section to the evaporator section. Line 38 extends from generator section 30 through solution heat exchanger 27 to absorber section 10 and serves to return relatively hot, strong absorbent solution from the generator section to the absorber section while passing it in heat exchange relation with relatively cool, weak solution being forwarded to the generator for concentration thereof.

A bypass line 39 and bypass valve 40 having a suitable actuator mechanism may be provided for capacity control of the refrigeration system. Reference is made to Leonard application Serial No. 2,203, filed January 13, 1960, now Patent 3,054,272, granted September 18, 1962, for a more complete description of the control arrangement.

A steam inlet line 41 and a steam outlet line 42 having a suitable steam trap 43 may be provided to admit steam to heat exchange tubes 31 in order to boil off refrigerant vapor from weak solution supplied to the generator thereby concentrating the weak solution. Other heating medium may be employed, if desired, to heat solution in generator 30.

The vaporized refrigerant passes through eliminators 36 and is condensed in condenser 32. For this purpose, a cooling water inlet line 44 is connected to heat exchange tubes 12 in absorber section 10 through which the cooling water passes through line 45 to heat exchange tubes 33 in the condenser section. The cooling water is then discharged through line 46 and an appropriate bypass line and valve 47 may be provided to bypass cooling water around the condenser section, if desired.

A suitable recirculation line 48 and refrigerant recirculation pump 49 is provided to pass refrigerant from pan 16 of the evaporator section through line 50 to spray header 18 so that refrigerant may be sprayed over heat exchange tubes 17 to wet them and aid in cooling of the medium passing through heat exchange tubes 17. Lines 52 and 53 are provided to conduct a heat exchange fluid, such as water, through heat exchange tubes 17 to cool the fluid by the resulting heat exchange with the cooled refrigerant in evaporator 15. This cooled heat exchange fluid is then passed by a pump (not shown) to suitable remotely located heat exchangers to provide cooling in the desired regions.

Referring particularly to FIGURE 1, there is shown a purge arrangement 100 for purging the absorption refrigeration machine previously described. Purge arrangement 100 comprises a separation chamber or region 101 formed by a shell which may be of any desired cross-section, such as circular, and which may extend generally vertically, as shown in the drawing. Separation chamber 101 is greatly exaggerated in size with respect to absorber shell 11, for purposes of clarity in illustration, and it will be appreciated that in practice this separation chamber may be much smaller. It will also be understood that while separation chamber 101 is shown in the drawing to be formed by a separate shell member, this chamber, in practice, may be incorporated into one of the other vessels of the refrigeration machine, or it may comprise a region or portion of the refrigeration machine or other vessel instead of being a separate chamber, and that the term separation chamber, as herein used, is intended to include such embodiments of the invention.

Relatively noncondensible gases, such as air, as well as some relatively condensible gases such as water vapor, are passed from absorber section 10, through line 13, through a purge line valve 102, and a purge inlet passage 103, into purge chamber 101. Purge line valve 102 may be of any suitable type, such as a check or other type valve, which may be either automatically or manually controlled to restrict the return of noncondensible gases from separation chamber 101 to absorber section 10.

Preferably adjacent the upper region of separation chamber 101, there is provided an exhaust passage 104 which provides an outlet for expelling noncondensible gases from the separation chamber. Exhaust valve 105, which is preferably a check valve, is provided between exhaust passage 104 and exhaust passage 106 to permit noncondensible gases to be expelled from separation chamber 101 through passage 106, while at the same time substantially preventing the return or ingress of air or other ambient fluid from passage 106 into the separation chamber. Exhaust passage 106 terminates at a desired location and may have an end open to the atmosphere, if desired, or may pass the non-condensible gases to some other desired region, such as a purged gas recovery unit or some other portion of the refrigeration system where they are not deemed objectionable.

A heat exchanger, which may comprise a generally cylindrical shell 107 having an open upper end, is disposed within separation chamber 101. A cooling coil 108, having an inlet line 109 and an outlet line 44, may be helically disposed about shell 107. It will be understood that coil 108, as shown in the drawing, is schematic in nature and that heat exchanger 107 may comprise a multiple pass heat exchanger or other configuration, if desired. As shown in the drawing, line 109 passes a cooling fluid such as condensing water from a cooling tower (not shown), chilled water, or refrigerant through heat exchange coil 108 from which the cooling fluid may pass through line 44 to absorber tubes 12. It will be appreciated that other cooling means and configurations may be employed instead of the arrangement shown, if desired.

An absorbent solution line 115 is connected to absorbent solution line 26 through which weak solution is pumped by solution pump 25 from absorber section 10 to generator section 30. A fraction of this weak solution is therefore diverted through solution valve 116 and solution line 115 to the interior of heat exchanger 107. This solution passes upwardly through the hollow interior of heat exchanger 107 while being cooled by the cooling fluid passing through cooling coil 108. The solution then overflows the notches in the upper portion of heat exchanger 107 and is enabled to pass downwardly over the outside of cooling coil 108 for further cooling.

Absorbent solution is passed through solution line 115 into the interior of separation chamber 101 and is cooled by heat exchange with the cooling fluid passing through heat exchange coil 108 to a temperature and a corresponding pressure which is substantially lower than that in the interior of absorber section 10. Consequently, separation chamber 101 comprises an auxiliary absorber chamber having a lower pressure therein than the pressure existing in absorber section 10 of the refrigeration system. Relatively noncondensible gases, which exist in a vapor state in absorber section 10, are therefore induced to flow through purge lines 13 and 103 to the separation chamber due to the difference in pressure between the separation chamber and the absorber section. The relatively noncondensible gases may be induced to pass from absorber section 10 to separation chamber 101 by being swept along with relatively condensible gases which pass to the separation chamber and which are absorbed and condensed therein. This flow of relatively condensible gases may take place with an extremely small pressure difference between the separation chamber and the absorber section, because the gases are swept toward the separation chamber due to absorption and condensation of the condensible gases in the separation chamber. This action, however, may effectively be thought of as due to a slight overall pressure difference between the separation chamber and the absorber due to the temperature differences of the absorbent solution in these regions. Actually, the partial pressure of the relatively noncondensible gases in the separation chamber may exceed the partial pressure of these gases in the absorber section due to the flow of condensible gases through the purge line preventing their return to the absorber section. These noncondensible gases are withdrawn from absorber section 10, transferred through purge lines 13 and 103 to separation chamber 101 where they are collected and stored.

An absorbent solution return line or passage 117 is provided to return absorbent solution from the lower portion of separation chamber 101 back to absorber section 10. Return valve 118 is provided in return line 117 and may be manually or automatically opened or closed to permit or restrict the return of absorbent solution from separation chamber 101 back to absorber section 10.

When return valve 118 is relatively open, absorbent solution in separation chamber 101 may be displaced by noncondensible gases which pass into the separation chamber through purge passage 103. In addition, when return valve 118 is open, relative to solution valve 116, the absorbent solution passing through line 115 into separation chamber 101 is permitted to return through line 117 to absorber section 10. When return valve 118 is restricted or closed, relative to solution valve 116, absorbent solution which is passed through line 115 by solution pump 25 floods separation chamber 101 at a rate in excess of that at which it can return to absorber section 10, and, consequently, the level of absorbent solution in the separation chamber rises.

It will be seen that the level of absorbent solution in separation chamber 101 may be raised either by closing return valve 118 with respect to solution valve 116 or by opening solution valve 116 with respect to return valve 118. Under these circumstances, purge line valve 102 is either manually or automatically closed to restrict the return of uncondensed gases back to absorber section 10. When the level or absorbent solution in separation chamber 101 is caused to rise, the uncondensed gases above the level of solution in the separation chamber are compressed to a pressure which is dependent upon the pressure of absorbent solution in line 115, which is generated by solution pump 25.

In order to achieve the exhaust function desired, it is necessary that the fluid used to flood separation chamber 101 be delivered to the separation chamber under a pressure which is greater than that necessary to compress the gases therein to a pressure sufficient to open valve 105, if a check type valve is used, and which is also greater than the pressure of the ambient fluid in exhaust passage 106 leading to the desired location to which the noncondensible gases are to be expelled to prevent ingress of ambient fluid into the separation chamber. In the illustrated embodiment, if exhaust passage 106 terminates to the atmosphere it is necessary that solution pump 25 have sufficient head to deliver solution to separation chamber 101 at a pressure in excess of atmospheric pressure, and exhaust check valve 105 should desirably open at a pressure above atmospheric pressure, but below that at which solution pump 25 is capable of delivering solution to the separation chamber. An auxiliary or booster pump (not shown) may be used in line 115, if desired, to provide the required pressure.

As the pressure on the uncondensed gases increases due to flooding of separation chamber 101, the relatively condensible gases such as refrigerant condense or are absorbed into the solution in the separation chamber. The separation chamber, therefore, serves both to separate the relatively noncondensible gases from the undesired region in the refrigeration system and also to recover the relatively condensible gases removed from the system by separating them from the relatively noncondensible gases which are then expelled to the desired location. The relatively condensible gases, which normally would be wholly or largely refrigerant such as water vapor, are recovered and returned to the system through return line 117 along with solution which is displaced from the separation chamber by subsequent transfer of uncondensed gas into the separation chamber.

As the pressure of the remaining noncondensible gases is raised above the pressure at which exhaust check valve 105 opens, the noncondensible gases are expelled through exhaust passages 104 and 106 to the desired location selected for the termination of passage 106. The relatively noncondensible gases are, therefore, withdrawn from a desired region of the refrigeration system where they may tend to accumulate, transferred through purge passage 103 to separation chamber 101, and expelled through exhaust and purge passages 104 and 106 to a desired location by flooding of the separation chamber with a liquid, thus purging the refrigeration system.

When the level of absorbent solution in separation chamber 101 reaches a desired level, return valve 118 is either opened with respect to solution valve 116, or, in other words, solution valve 116 is closed with respect to return valve 118, and the level of absorbent solution ceases to rise in the separation chamber. Thereafter, purge line valve 102 is again opened, and as noncondensible gases are transferred from absorber section 10 to separation chamber 101, they again displace solution in the separation chamber, which is returned through line 117 back to the absorber so that the purging cycle starts over again.

Valves 116, 118 and 102 may be manually opened and closed in accordance with the foregoing sequence to operate the purging sequence, or these valves may be automatically controlled. Either valve 118 or valve 116 can be omitted if desired. In the case that valve 116 is omitted, closing return valve 118 will cause solution to flood separation chamber 101, and opening return valve 118 will cause noncondensible gases to displace solution in the purge chamber. On the other hand, if valve 118 is omitted, valve 116 may be provided with a fully open position in which case solution line 115 delivers more solution to separation chamber 101 then can be returned through a more restricted return line 117, thus raising the level of solution in the separation chamber. In addition, when return valve 118 is omitted, solution valve 116 should be provided with a relatively more restricted or relatively closed position whereby less solution is admitted to separation chamber 101 than can be returned through return line 117 so that noncondensible gases transferred to the separation chamber may displace solution therein through return line 117. It may be seen, therefore, that the control of the purge operation depends merely upon the restriction or admittance of lines 115 and 117 relative to each other.

FIGURE 1 illustrates by dotted lines one means for automatically controlling the operation of valves 102, 116 and 118. For this purpose, a high level float valve 119 and a low level float valve 120 are provided in separation chamber 101 and are associated by suitable electrical, mechanical, pneumatic or other control systems with valves 102, 116 and 118. When the level of solution in separation chamber 101 rises to a predetermined high point in the chamber, high level float valve 119 either opens return valve 118 wider or closes solution valve 116 further or performs both functions, and, in addition, float valve 119 opens purge line valve 102 to begin the displacement of solution in the separation chamber with noncondensible gases. When the level of solution in separation chamber 101 drops to a predetermined low level as determined by low level float valve 120, return valve 118 is either automatically closed or solution valve 116 is relatively opened, or both functions are made to occur simultaneously, and at the same time, purge line valve 102 is closed to restrict the return of noncondensible gases back to absorber section 10, thereby effecting the flooding and expelling of the gases from the separation chamber.

Referring particularly to FIGURE 2 there is shown a modified embodiment of a purge arrangement in accordance with this invention. Similar parts of the regrigeration system have been designated by similar reference characters to those used in FIGURE 1 and certain corresponding or related parts of the purge arrangement have been indicated by adding 100 to the reference character shown in FIGURE 1.

Purge arrangement 200, as shown in FIGURE 2, comprises a generally vertically disposed closed shell of suitable cross-section forming a separation chamber 201. As previously described, separation chamber 201 may comprise in practice, a suitably defined region in one of the vessels or components of the refrigeration system rather than a separate vessel as shown in the drawings. Purge line 13 is connected to purge passage 203 through a suitable manually or automatically controlled purge line valve 202 to conduct uncondensed gases including relatively noncondensible gases from a desired region in absorber section 10 to separation chamber 201.

Exhaust passage 204 is connected in series with exhaust check valve 205 and exhaust line 206, which conducts noncondensible gases expelled from separation chamber 201 to a desired region.

The lower portion of purge unit 200 may comprise a heat exchanger section having a shell 207 separated from the separation chamber by a partition 213. A cooling coil 208 is provided to conduct a cooling fluid passing through a heat exchanger inlet 209 and a heat exchanger outlet line 44 which may then pass the cooling fluid into absorber tubes 12, if desired.

An ejector inlet line 210 extends from heat exchanger 207 to a jet ejector 214 and serves to conduct cooled solution from the heat exchanger to the jet ejector. Jet ejector 214 is provided with a restricted throat region 212 in order to provide a relatively low pressure high volocity fluid region due to the passage of cooled solution through the throat region, as is well understood in the art.

An absorbent solution line 215 having a solution valve 216 is connected to weak solution line 26 to conduct absorbent solution to heat exchanger 207 under a pressure developed by solution pump 25. A return line or passage 217 having a return valve 218 is provided to return absorbent solution from separation chamber 201 back to absorber section 10.

As in the preceding embodiment of this invention, valves 202, 216 and 218 may be manually or automatically controlled by a suitable valve control arrangement which is schematically illustrated by broken lines. An automatic control arrangement is shown for operation of purge line valve 202 and return valve 218. The automatic control comprises a high level float valve 219 and a low level float valve 220. When the solution level in separation chamber 201 rises to a predetermined maximum desired height, high level float valve 219 actuates return valve 218 and purge line valve 202 to a relatively open position so that uncondensed gases passed to the separation chamber may displace solution. When the level of solution in separation chamber 201 drops to a predetermined level corresponding with a predetermined volume of uncondensed or relatively noncondensible gases in the separation chamber, low level float valve 220 actuates purge line valve 202 to a closed or restricted position so as to restrict the return of uncondensed gases to absorber section 10. At the same time, low level float valve 220 also actuates solution return valve 218 to a relatively closed position to restrict the return to absorber section 10 of absorbent solution, admitted to the separation chamber through ejector outlet line 211, thereby initiating the expulsion of the relatively noncondensible gases from the separation chamber.

In operation, assuming purge valve 202, return valve 218 and solution valve 216, are open, pump 25 delivers a quantity of weak solution through solution line 215 to heat exchanger 207. A cooling medium such as cooling tower water is passed through lines 209 and heat exchange coil 208 to cool the absorbent solution which has been passed to heat exchanger 207. The heat exchange fluid is then passed from heat exchanger 207 through ejector inlet line 210 through the low pressure throat region 212 of the ejector and through ejector outlet line 211 into the interior of separation chamber 201. Passage of the relatively cool absorbent solution through restricted throat region 212 provides a relatively low pressure region in the throat of the jet ejector. Since the absorbent solution passing through the throat of the jet ejector is cooled to a temperature below that of the temperature of the absorbent solution in absorber section 10, noncondensible gases such as hydrogen and air are withdrawn from absorber section 10 and induced to flow through purge line 13 and purge passage 203 to low pressure throat region 212 of the ejector. These relatively noncondensible gases, including some relatively condensible gases, such as refrigerant vapor, are entrained in the stream of solution passing through the jet ejector and are transferred into separation chamber 201. The gases displace a quantity of solution in the separation chamber and the displaced solution passes through return line 217 back to absorber section 10. The pressure in separation chamber may be relatively high, if desired, to provide for storage of a considerable volume of noncondensible gases therein.

When the level of solution in separation chamber 201 drops below the predetermined level of low level float valve 220, purge valve 202 is actuated to a closed position to restrict the return of noncondensible gases to absorber section 10 and return valve 218 is actuated to a closed position to restrict the return of absorbent solution to the absorber section. Consequently, additional solution pumped to separation chamber 201 by solution pump 25 through solution line 215 and ejector outlet line 211, begins to flood the separation chamber raising the solution level therein. As the level of solution rises in the separation chamber, uncondensed gases therein are compressed. As these gases are compressed the relatively condensible gases are condensed or absorbed into the absorbent solution in the separation chamber and the pressure on the relatively noncondensible gases continues to increase as more solution is supplied to the separation chamber.

Solution pump 25 must be capable of delivering solution to separation chamber 201 at a pressure greater than the pressure of the ambient fluid in line 206. In the case that line 206 is open to the atmosphere, pump 25 must be able to develop a head greater than atmospheric pressure. Check valve 205 is adjusted to open at a pressure slightly in excess of the pressure of the ambient fluid in line 206. When the pressure of the remaining noncondensible gases in the upper portion of separation chamber 201 reaches that pressure which is necessary to open check valve 205, the check valve opens and the noncondensible gases are exhausted from the separation chamber and expelled to a desired location through line 206.

When the level of absorbent solution in separation chamber 201 reaches a predetermined height as determined by float valve 219, return valve 218 is actuated to an open position and purge line valve 202 is also automatically opened. Check valve 205 immediately closes to prevent the ingress of ambient fluid into the separation chamber and the purging cycle begins over again.

As explained in connection with the preceding embodiment, the flooding of separation chamber 201 with absorbent solution may be accomplished in the manner above described by restricting return line 217 with return valve 218, or in the alternative, solution line 215 may be made less restricted than return line 217 by opening solution valve 216 to a wider position. In that event, flooding is accomplished by opening solution valve 216 to an extent such that it supplies more absorbent solution to separation chamber 201 than can be returned through line 217. Furthermore, either or both of valves 218 and 216 may be simultaneously or alternatively automatically controlled by a level responsive device such as floats 219 and 220 to provide automatic control of the purging cycle upon the sensing of a predetermined volume of noncondensible or uncondensed gases in the separation chamber.

An ancillary advantage of the purge arrangements herein described lies in the fact that while the gases withdrawn from absorber section 10 are in an uncondensed state when withdrawn, in fact, some of these gases, which are relatively condensible, are actually condensed or absorbed and recovered in the separation chamber rather than being lost from the system. Therefore, uncondensed refrigerant and other relatively condensible gases which are withdrawn to separation chamber 10 are automatically returned to the refrigeration system by being absorbed or being compressed and condensed in the separation chamber.

While this invention has been described with particular reference to the application of purging an absorption refrigeration machine, it will be appreciated that it is adapted to the purging of other refrigeration systems as well. Further, it will be understood that while the preferred embodiments described utilize an auxiliary absorber or a jet ejector as a transfer device and for withdrawing noncondensible gases from the refrigeration system, other transfer devices such as a vacuum pump which may be a relatively inexpensive diaphragm pump or a fall tube transfer device may be utilized instead. It will be noted that it is unnecessary for the transfer device to be capable of lifting the noncondensible gases from the very low absorber pressure up to the pressure which exists in line 206. On the contrary, a simple and inexpensive diaphragm pump or other transfer device is all that is required by the described invention because the noncondensible gases can be transferred to the separation chamber at substantially the same pressure or even a lower pressure than exists in the absorber section of the refrigeration machine. The motive force for raising the pressure of the noncondensible gases to the necessary exhaust pressure is supplied in the system described by liquid pump which is relatively easily designed to have sufficient head for the purpose.

Another advantage of the preferred embodiment described is that it may utilize a system liquid for the flooding of the separation chamber and the expelling of the noncondensible gases therefrom. The system described is therefore inherently hermetic and does not provide a path for air to pass back into the refrigeration system. However, it will be understood that any substantially incompressible fluid, whether or not it is a system liquid, may be alternatively utilized to flood the separation chamber. In the event that the fluid utilized to flood the separation chamber is not one present in the refrigeration system, it may be desirable for the return line from the separation chamber to terminate at some other point than that shown in the preferred embodiment such as in a liquid reservoir.

It will also be appreciated that another advantage of the system described is that it may use a system pump to provide the motive power to exhaust the noncondensible gases from the refrigeration system. However, in the event that a system pump having sufficient head pressure is not available for the purpose, a separate pump may be utilized instead. Alternatively, an auxiliary pump may be utilized in the solution line leading to the separation chamber in order to boost the head or a partial solution system pump to achieve proper exhaust of the noncondensible gases.

Depending on the pressures present or available in the system with which the purge arrangement is to be employed, the displacing of liquid in the separation chamber may be achieved by utilizing a pump, or other arrangement, either to transfer the gases into the separation chamber under pressure or to withdraw the liquid therefrom. It will also be understood that all of the various valves herein shown may be replaced by equivalent traps, liquid seals or other arrangements for achieving their intended functions and may be either manually or automatically controlled, if desired.

Other modifications and embodiments of the method and apparatus described herein will readily occur to those skilled in the art. Accordingly, other embodiments of this invention than those illustrated are intended to be included within the scope of the following claims.

We claim:

1. A purge arrangement for removing relatively noncondensible gases from a portion of a refrigeration system and discharging them to a desired exterior region comprising:
   (a) a separation chamber for storing relatively noncondensible gases,
   (b) means for passing said relatively noncondensible gases from said portion of said refrigeration system to said separation chamber,
   (c) exhaust valve means for passing said relatively noncondensible gases from said separation chamber to said desired region while substantially preventing passage of ambient fluid from said desired region to said separation chamber, and
   (d) means for passing liquid to said separation chamber under a pressure greater than the pressure in said desired region, to expel the relatively noncondensible gases from said separation chamber, through said exhaust valve means, to said desired region.

2. A purge arrangement as defined in claim 1 wherein said liquid is displaced from said separation chamber by the noncondensible gas passed thereto, and;
   (a) the liquid which is passed to said separation chamber for expelling noncondensible gases therefrom comprises a liquid in said refrigeration system, and
   (b) said purge arrangement includes passage means to return liquid displaced from said separation chamber to said refrigeration system after expulsion of said relatively noncondensible gases from said separation chamber.

3. A purge arrangement as defined in claim 1 wherein: said arrangement includes an automatic purge exhaust actuation means to automatically flood said separation chamber with said liquid upon sensing a predetermined level of liquid in said separation chamber corresponding to the accumulation of a predetermined volume of noncondensible gases therein.

4. A purge arrangement for purging relatively noncondensible gases from an absorption refrigeration machine having a condenser, an evaporator, a generator and an absorber connected to form a refrigeration system, said purge arrangement comprising:

(a) a separation chamber adapted to contain a liquid, (b) means defining a passage connecting said absorber and said separation chamber for passing relatively noncondensible gases from said absorber to said separation chamber to displace liquid therein, (c) means defining an outlet from said separation chamber for expelling relatively noncondensible gases passed thereto, (d) exhaust valve means associated with said outlet from said separation chamber to permit expulsion of said relatively noncondensible gases from said separation chamber and to prevent ingress thereinto of ambient fluid, (e) means to pass a liquid from said absorption refrigeration system into said separation chamber under a pressure sufficient to expel relatively noncondensible gases therefrom through said outlet means and said exhaust valve means, and (f) means to return liquid displaced from said separation chamber to said absorption refrigeration system.

5. A purge arrangement as defined in claim 4 including means to periodically restrict the return of said liquid to said absorption refrigeration system from said separation chamber, in order to periodically expel said relatively noncondensible gases from said separation chamber.

6. An absorption refrigeration system comprising:

(a) an absorber section, (b) a condenser section, (c) an evaporator section, (d) a generator section, (e) means including a solution pump for passing an absorbent solution from said absorber section under pressure to a desired portion of said absorption refrigeration system, and (f) a purge arrangement for transferring relatively noncondensible gases from a desired portion of said absorption refrigeration system to a desired region, said purge arrangement comprising:

(1) a separation chamber, (2) means, including a purge passage, connecting said absorber section to said separation chamber for transferring relatively noncondensible gases from said absorber section to said separation chamber, (3) exhaust check valve means permitting relatively noncondensible gases to be expelled from said separation chamber, through said check valve means, to said desired region while substantially preventing the ingress of ambient fluid from said desired region into said separation chamber, (4) means defining a passage connecting the discharge of said solution pump to said separation chamber for passing absorbent solution from said absorber section to said separation chamber to compress said relatively noncondensible gases accumulated therein to a sufficient pressure to expel them from said separation chamber, through said exhaust check valve, to said desired region, and (5) means defining a return passage to return absorbent solution displaced by said relatively noncondensible gases from said separation chamber to said absorber section.

7. An absorption refrigeration system as defined in claim 6 including automatic purge exhaust actuator means to automatically flood said separation chamber with absorbent solution upon sensing a predetermined accumulation of noncondensible gases therein.

8. An absorption refrigeration system as defined in claim 6 wherein said means including a passage for transferring relatively noncondensible gases from said absorber section to said separation chamber includes: a jet ejector having a low pressure throat region interposed in series with said means defining a passage connecting the discharge of said solution pump to said separation chamber, said purge passage for transferring the relatively noncondensible gases to the separation chamber being in communication with the low pressure throat region of said jet ejector to induce the flow of the relatively noncondensible gases from said absorber section to said separation chamber through the low pressure throat region of said jet ejector.

9. An absorption refrigeration system as defined in claim 8 further including: means to cool absorbent solution passed from said solution pump to said jet ejector in order to provide a pressure in said low pressure throat region thereof substantially below the pressure in said absorber section to enhance the flow of said relatively noncondensible gases from said absorber section to said separation chamber.

10. An absorption refrigeration system as defined in claim 6 wherein said purge arrangement includes return valve means interposed in said return passage so that closure of said return valve effects said expulsion of the relatively noncondensible gases from said separation chamber through said exhaust check valve due to accumulation of absorbent solution in said separation chamber.

11. An absorption refrigeration system as defined in claim 6 including solution valve means interposed in the passage means extending between the discharge of said solution pump and the separation chamber so that when said valve is in a relatively open position, said separation chamber is thereby flooded with absorbent solution at a rate greater than that at which the solution is returned to said absorber section from said separation chamber, so that said relatively noncondensible gases are thereby expelled from said separation chamber through said exhaust check valve.

12. A method of purging a refrigeration system of relatively noncondensible gases which comprises the steps of:

(a) withdrawing said relatively noncondensible gases from a region of said refrigeration system from which it is desired to remove them, (b) transferring the relatively noncondensible gases withdrawn from said region to a separation region, (c) periodically expelling the relatively noncondensible gases from said separation region to a desired location by passing a liquid into said separation region under a sufficient pressure to compress the relatively noncondensible gases to a sufficient pressure to expel them from said region, while restricting return of said relatively noncondensible gases to the region of said refrigeration system from which they were withdrawn.

13. In a method of purging an absorption refrigeration system, having an absorbent solution therein, of relatively noncondensible gases which consists in the steps of:

(a) withdrawing said relatively noncondensible gases from a relatively low pressure region of said absorption refrigeration system, (b) transferring said relatively noncondensible gases withdrawn from said relatively low pressure region to a separation region and displacing absorbent solution therewith, (c) accumulating said relatively noncondensible gases in said separation region, (d) restricting the return of said relatively noncondensible gases from said separation region to said relatively low pressure region from which they were withdrawn, (e) periodically flooding said separation region with absorbent solution under a pressure sufficient to expel said relatively noncondensible gases from said separation region to a desired location, and (f) returning absorbent solution displaced from said separation region to said absorption refrigeration system to enable repetition of the purging cycle.

14. The method of purging an absorption refrigeration system as defined in claim 13 wherein the steps of withdrawing and transferring the relatively noncondensible gases from said relatively low pressure region includes the steps of:
(a) cooling a quantity of absorbent solution to a temperature corresponding to a pressure below that existing in said relatively low pressure region,
(b) passing the cooled absorbent solution through an ejector having a relatively low pressure throat region in communication with said relatively low pressure region of said absorption refrigeration system, to induce said relatively noncondensible gases to flow from said relatively low pressure region to the lower pressure throat region of said ejector, and
(c) passing the relatively noncondensible gases from said ejector to said separation region.

15. The method of purging an absorption refrigeration system as defined in claim 13 wherein the step of periodcally flooding said separation region is achieved by periodically increasing the flow of absorbent solution to said separation region.

16. The method of purging an absorption refrigeration system as defined in claim 13 wherein the step of periodically flooding said separation region is achieved by periodically restricting the return of the absorber solution from said separation chamber to said refrigeration system.

17. The method of purging an absorption refrigeration system as defined in claim 13 wherein the step of periodically flooding said separation region includes:
(a) automatically sensing a predetermined level of absorbent solution in said separation region, and
(b) automatically initiating the flooding of said separation region in response to sensing said predetermined level of absorbent solution therein.

18. A method of removing gases from a region of a refrigeration system and transferring them to a desired location which consists in the steps of:
(a) displacing a liquid in a displacement chamber with gases withdrawn from said region of said refrigeration system,
(b) restricting the return of said gases back to said region of said refrigeration system, and
(c) introducing a liquid into said displacement chamber under a pressure sufficient to compress said gases to a sufficient pressure to expel said gases therefrom through an exhaust passage to a desired location.

References Cited in the file of this patent

UNITED STATES PATENTS

| | | |
|---|---|---|
| Re. 23,093 | Roswell | Mar. 22, 1949 |
| 2,765,634 | Whitlow | Oct. 9, 1956 |
| 2,840,997 | Leonard | July 1, 1958 |
| 2,986,894 | Endress et al. | June 6, 1961 |
| 2,986,905 | Kocher et al. | June 6, 1961 |
| 3,013,404 | Endress et al. | Dec. 19, 1961 |
| 3,081,605 | Leonard | Mar. 19, 1963 |